April 11, 1950 — J. J. HARTL — 2,503,871
STRADDLE GAUGE FOR CYLINDRICAL WORK
Filed Feb. 23, 1945
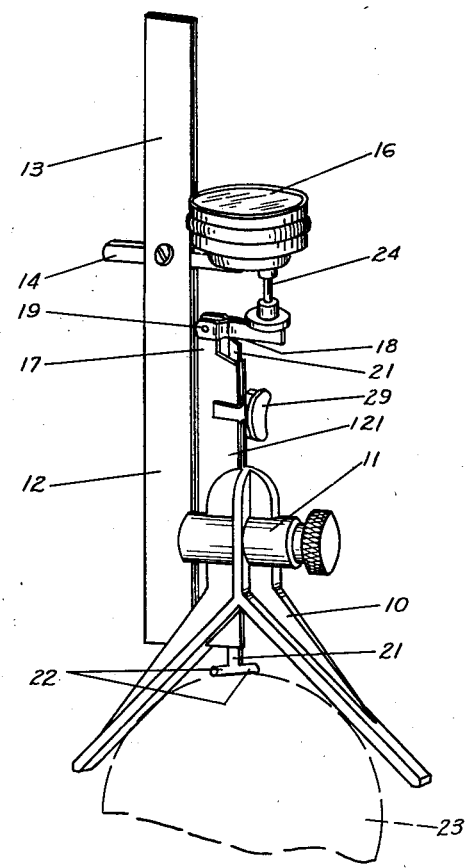
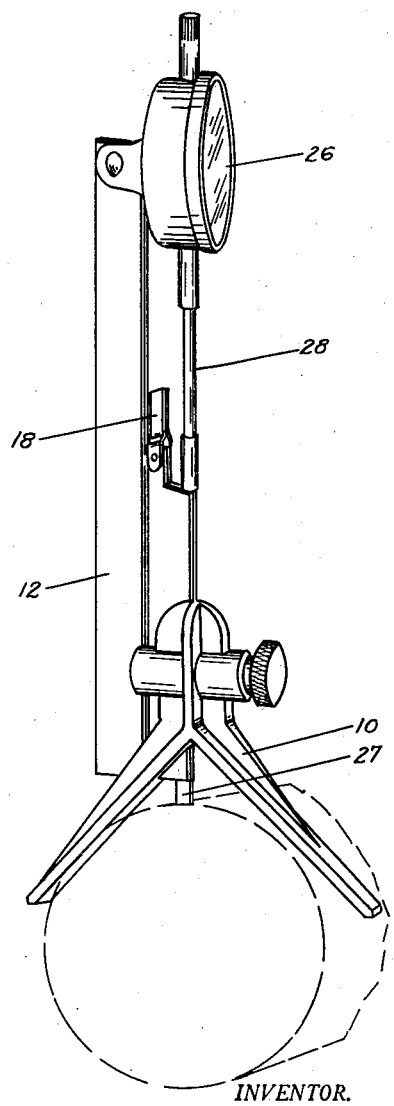
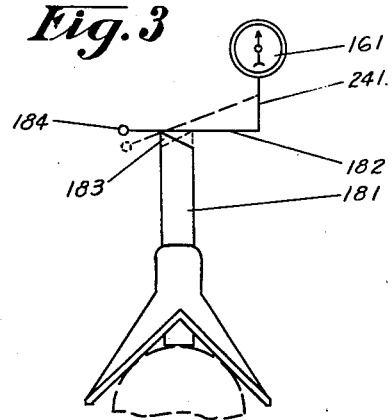
INVENTOR.
JOHN J. HARTL
BY Flournoy Corey
ATTORNEY.

Patented Apr. 11, 1950

2,503,871

UNITED STATES PATENT OFFICE 2,503,871

STRADDLE GAUGE FOR CYLINDRICAL WORK

John J. Hartl, Cedar Rapids, Iowa

Application February 23, 1945, Serial No. 579,354

6 Claims. (Cl. 33—178)

This invention relates to measuring instruments and has particular relation to means for measuring the curvature of various bodies to which it may be applied. It finds particularly advantageous use in measuring the curvature and hence the diameter of shafts and the like at rest or while in motion, and for measuring the depth of grooves and the like.

In turning shafts and the like on a lathe it is the usual practice to apply calipers or micrometers of the jaw type, but this procedure makes it necessary to stop the lathe or the machine while measurement is being made. In many operations, stopping and starting a lathe are quite likely to make imperfections in the work and if heavy cuts are being made or if the work is of particularly hard material, or if the material does not lend itself well to machining, damage not only to the work but to the cutting instrument may result.

It is therefore among the objects of my invention to provide a measuring instrument which may be used on the work while it is in motion and which may be employed to determine the diameter of shafts, the depth of grooves, threads or the like, or the bridge gauge, and many other uses.

Another important object of my invention is to provide means for utilizing the extremely sensitive dial type micrometer or indicator for making these measurements.

Another object of my invention is to provide means for magnifying the movement of a rod or feeler so as to increase the sensitivity of a micrometer.

Still another object of my invention is to provide means of adjustably varying the sensitivity of a micrometer or the like.

Still another object of my invention is to provide a very simple and inexpensive tool for utilizing a dial type micrometer or indicator for measuring shafts and the like.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a view in perspective of one embodiment of my invention as it is utilized in connection with the type of micrometer in which the actuating member projects through the back of the case.

Figure 2 is a view in perspective of my device as it appears while in use in connection with the type of micrometer in which the actuating member extends through the side of the case, and Figure 3 is a diagram illustrating how the actuating force applied to the micrometer may be applied so as to increase or decrease the sensitivity of the micrometer.

Referring now to the drawings, and more particularly to Figure 1 thereof, a device constructed according to a preferred embodiment of my invention employs a Y-shaped frame member, such as the head of a center square and as illustrated at 10. This member 10 is provided with a conventional locking means, illustrated at 11, by which a grooved slide member 12 may be locked to the Y member 10. This slide member 12 is cut away at its upper inner portion so as to provide an upstanding post 13 to which a bar 14, supporting the dial type micrometer 16, may be engaged. The upper end of the inner portion 121 of the slide 12 is cut away to provide a post 17 to which a clevis-like lever 18 may be pivotally engaged by means of the pivot 19.

The inner edge of the post member 12 is slotted to receive an actuating means or stem 21 which may slide vertically therein. The lower end of this stem 21 may be provided with extensions such as illustrated at 22 so as to provide an enlarged surface engaging portion for engaging the face of the work 23.

The upper end of the stem 21 is preferably cut at an angle, as illustrated more particularly in Figure 3, so that engagement of the stem with the lever 18 is a line engagement rather than a surface engagement. It is obvious that if the oppositely disposed jaws of the base member 10 are applied to a curved surface, such as the work 23, that differences in curvature of the work will be reflected in movement of the indicating needle of the micrometer or indicator 16, and that if the relation of the length of the lever 18 to the distance from the point of the stem 21 is four to one, the indicating needle will be caused to move four times as much as it would if application of the stem was made direct to the actuating button 24 of the micrometer 16. This condition is illustrated in Figure 3 by the dotted line position of the stem 181. The length of the arm or lever 182 is approximately four times the distance from the point of application of the stem 181 at 183 to the pivot point 184. Now reversal of the stem 181 to the dotted line position will make the ratio of length of lever arm to the length of the arm from pivot 184 to the point of application approximately two to one, and therefore the movement of the plunger 241 of the micrometer 161 will be only twice as great as the movement of the stem 181.

In Figure 2 I have illustrated a modified form of the invention which employs the same base member 10 and slide 12, but in this case another type of micrometer or indicator, illustrated at 26, is employed and this micrometer 26 is attached to the slide 12 so that the micrometer is in a vertical plane. The lever 18 is swung out of the way so that the stem 27 bears directly against the plunger 28 of micrometer 26. In this form of the invention the lower end of the extensions does not employ the stem 22 shown in Figure 1.

It is apparent that a device constructed according to my invention may be employed for measuring the curvature of shafts and the like while they are being turned without stopping the lathe or other turning machine. More particularly, the instrument is adapted for determining minute changes in curvature. It is an extremely sensitive tool by reason of the leverage system which I have employed and extremely minute changes of curvature may be detected. The device may be employed to measure eccentricity of a shaft or the like and obviously it may be employed to measure the depth of grooves or other indentations in a work surface. It will indicate the taper in a shaft or the like and measure this difference in curvature along a shaft or the like. It may be employed to measure depth of threads, splines, or as a means for measuring the depth of keyways and the like. It may also be employed as a bridge gauge for determining any irregularities of a plane surface.

If desired, I may employ a saddle-like thumb rest, such as illustrated at 29, which may be clipped on the slide 12. These and other modifications may be made without departing from the spirit and scope of my invention as set forth in the appended claims.

I claim as my invention:

1. In a measuring instrument, a Y-shaped work engaging member, the jaws of which may rest upon the work such as a shaft or the like, a slide member, means for securing an indicator including a plunger to the slide member, the slide member being adapted to slide within the work engaging member to permit positioning the indicator at various distances from the work engaging member, a stem slidable in the slide member and adapted at one end to engage work between the jaws of the work engaging member so as to measure curvature of the work, a lever pivotally attached to the slide and having a portion thereof so positioned so as to bear against the plunger of the indicator, the opposite end of the stem being so positioned as to bear against the lever at a point spaced from the pivotal mounting of the lever and from the plunger of the indicator.

2. In a measuring instrument, the combination with the head of a center square, of a support adjustably mounted in the head, a dial indicator including a plunger secured to the said support, a stem received for sliding movement in a recess in the said support, and a multiplying lever pivotally mounted on the support and adapted to bear against the plunger of the indicator, the stem adapted, at one end, to contact the said lever, and at the other end, to contact the surface of work disposed within the head.

3. In a device of the character described, a work engaging member having angularly divergent legs, a dial type indicator including a plunger, a slide adjustable with relation to the work engaging member and adapted to mount and support the indicator, a stem movable with relation to the work engaging member and adapted, at one end thereof, to contact the surface of work at a point intermediate the angularly divergent legs, and movement multiplying means operatively disposed between the other end of the stem and the plunger of the indicator.

4. In a measuring instrument, the combination with a work engaging means comprising a body having a pair of jaws disposed in fixed angular relation, of a support adjustably mounted in the said work engaging means, a dial indicator, including a plunger, secured to the said support, a stem received for sliding movement in a recess in the said support, and a multiplying lever pivotally mounted on the support, the free end of the said lever being adapted to bear against the plunger of the indicator, and the said stem being adapted, at one end thereof, to contact the said lever at a point spaced from its point of pivotal attachment to the support and adapted, at the other end thereof, to contact the surface of work disposed between the jaws of the said work engaging means.

5. In a measuring instrument, the combination with a head having divergent, work-contacting legs of a support adjustably mounted in the head, a dial indicator including a plunger secured to the said support, a stem received for sliding movement in a recess in the said support, and a multiplying lever pivotally mounted on the support and adapted to bear against the plunger of the indicator, the stem being reversible in the recess and having one end thereof cut off angularly to provide a fulcrum optionally engageable with the multiplying lever at a plurality of positions, the stem being adapted at the other end thereof to contact the surface of work positioned between the divergent legs of the head.

6. In a measuring instrument, the combination with the head of a center square having a slotted opening extending therethrough, of an elongated support adjustably mounted in the slotted opening of the head, a stem, the said support having a recesse therein to slideably receive the stem positioned to bisect the angle formed by the head, a multiplying lever pivotally mounted on the support and adapted to be moved by the said stem, the other end of the stem adapted to contact the surface of work disposed within the head, and a dial indicator mounted on the support and having a plunger operable by movement of the said multiplying lever.

JOHN J. HARTL.

REFERENCES CITED

The following references are of record in the file of this patent:

UNITED STATES PATENTS

| Number | Name | Date |
|---|---|---|
| 968,884 | Reisner | Aug. 30, 1910 |
| 1,339,384 | Douglass | May 11, 1920 |
| 1,401,119 | Aldeborgh | Dec. 27, 1921 |
| 1,768,931 | Pratt | July 1, 1930 |
| 1,941,456 | Arnold | Jan. 2, 1934 |
| 1,971,628 | Sutterlin | Aug. 28, 1934 |
| 2,177,399 | Aller | Oct. 24, 1939 |
| 2,212,306 | Schwartz | Aug. 20, 1940 |

FOREIGN PATENTS

| Number | Country | Date |
|---|---|---|
| 13,049 | Switzerland | Jan. 5, 1897 |
| 643,806 | France | Sept. 24, 1928 |